United States Patent [19]

Brusselmans

[11] 4,142,592
[45] Mar. 6, 1979

[54] REPAIRABLE ASSEMBLY FOR PROTECTING A CABLE JUNCTION AND METHOD OF ASSEMBLING SAME

[75] Inventor: Jacques Brusselmans, Kessel-Lo, Belgium

[73] Assignee: N.V. Raychem S.A., Kessel-Lo, Belgium

[21] Appl. No.: 552,191

[22] Filed: Feb. 24, 1975

Related U.S. Application Data

[63] Continuation of Ser. No. 417,389, Nov. 19, 1973, abandoned.

[30] Foreign Application Priority Data

May 25, 1973 [GB] United Kingdom ............... 25199/73

[51] Int. Cl.² .......................................... H02G 15/18
[52] U.S. Cl. ....................................... 174/92; 156/49; 156/86; 174/DIG. 8
[58] Field of Search ............ 174/DIG. 8, 84 R, 88 R, 174/91, 92, 93; 29/628, 630 F; 156/49, 86; 339/DIG.1, 208, 213 R

[56] References Cited

U.S. PATENT DOCUMENTS 3,582,868 6/1971 Trimble et al. ........ 339/DIG. 1 UX

FOREIGN PATENT DOCUMENTS

| | | | |
|---|---|---|---|
| 855599 | 11/1952 | Fed. Rep. of Germany ............. | 174/92 |
| 881816 | 2/1943 | France ..................................... | 174/93 |
| 1233632 | 5/1960 | France ..................................... | 174/92 |
| 1490745 | 6/1967 | France ..................................... | 174/88 R |
| 455904 | 7/1968 | Switzerland ............................. | 174/93 |
| 1065431 | 4/1967 | United Kingdom .................... | 174/84 R |

Primary Examiner—Laramie E. Askin
Attorney, Agent, or Firm—Lyon & Lyon

[57] ABSTRACT

An assembly for protecting and insulating a junction such as a splice between cables. The assembly may be repaired or modified without a complete renewal of the junction. The assembly includes a relatively rigid longitudinally split tube which is positioned about the junction. Relatively rigid support means, such as rings, are positioned at the ends of the tube and a plurality of relatively flexible prongs project longitudinally, at spaced intervals, around the circumference of at least one end of the tube. The prongs may be attached to, or formed integrally with the support means. A heat-shrinkable sleeve of length greater than the length of the tube, with the support means and prongs, is disposed about the tube, support means and prongs. At least part of the inner wall of the heat-shrinkable sleeve is provided with a sealant so that on shrinking, the end regions of the sleeve overlying the free ends of the prongs are shrunk down over the conduits and are sealed thereto.

18 Claims, 4 Drawing Figures

REPAIRABLE ASSEMBLY FOR PROTECTING A CABLE JUNCTION AND METHOD OF ASSEMBLING SAME

This is a continuation of application Ser. No. 417,389, filed Nov. 19, 1973 (now abandoned).

BACKGROUND OF THE INVENTION

The present invention relates to junctions between cables.

More particularly, the present invention relates to protecting and insulating junctions between cables.

It is frequently necessary to insulate and protect junctions between cables, such as electric cables. In effecting junctions between cables, for example telephone or power cables, on site, many problems arise in meeting the necessary requirements. Some of these requirements are continuity of insulation and grounding, rendering the joint waterproof and proof against attack by various chemical agents, and mechanical strength and resistance to tension, compression, flexing and impact.

It has been proposed, for example in U.S. Pat. No. 3,455,336, the disclosure of which is incorporated herein by reference, to use sleeves or tubes of heat-shrinkable material, which may or may not be longitudinally split, as protection and insulation for joints in electric cable. The sleeve in its initial, stressed state is of such a diameter that it may be readily moved into position. On the application of heat, the sleeve shrinks so that it fits tighty over the joint.

Since cables are frequently pressurized and must be waterproof, it may be necessary to coat a portion of the inner wall of the heat-shrinkable sleeve with a sealing compound, for example, a mastic or a hot-melt adhesive. When the sleeve is heated, the sealing compound is melted and forms a water-tight and pressure-tight seal between the sleeve and the cable. Protection sleeves, for functions of the type discussed above, suffer from the disadvantage that, in certain cases, they cannot easily be opened up for repair or modification, for example, the feeding in of extra cables, without necessitating complete renewal of the junction.

In copending application U.S. Ser. No. 395,546, filed Sept. 10, 1973 since abandoned, the disclosure of which is incorporated herein by reference, there is disclosed a junction assembly which can readily be opened up for repair or modification and resealed to form a water and pressure tight joint. The junction consists essentially of a relatively rigid longitudinally split tube provided with support means, preferably rings to be positioned one at each end of the tube, and a heat-shrinkable sleeve which is shrunk down over the tube. In a preferred embodiment, the inner surface of the end regions of the sleeve are coated with a sealing compound such that on shrinking, the ends of the sleeve are sealed onto associated cables. The middle section of the sleeve disposed over a split tube is preferably not sealed to the split tube. When the junction is to be opened up, the central section of the sleeve is cut away to reveal the split tube. The split tube can then be opened to attend to the splice or junction. After the repair or modification has been made, the split tube may be closed and the joint resealed by means such as, a split heat-shrinkable sleeve whose inner wall is coated with a sealing material and which is provided with means for sealing the split to form a water and pressure tight joint. A suitable closure device is described in previously mentioned U.S. Pat. No. 3,455,336.

SUMMARY OF THE INVENTION

It is an object of this invention to provide an assembly including a plurality of relatively flexible prongs positioned at least at one end of the assembly for protecting and insulating a junction between cables.

It is another object of this invention to provide an assembly, including a plurality of relatively flexible prongs positioned at least at one end of the assembly, for a junction between cables which may readily be opened for repair or modification, without necessitating the complete renewal of the junction.

It is a further object of this invention to provide a method of making a junction between cables.

BRIEF DESCRIPTION OF THE DRAWING

The invention both as to its organization and principles of operation together with further objects and advantages thereof may better be understood by referring to the following detailed description of an embodiment of the invention when taken in conjunction with the accompanying drawing in which.

DETAILED DESCRIPTION

Figure 1:
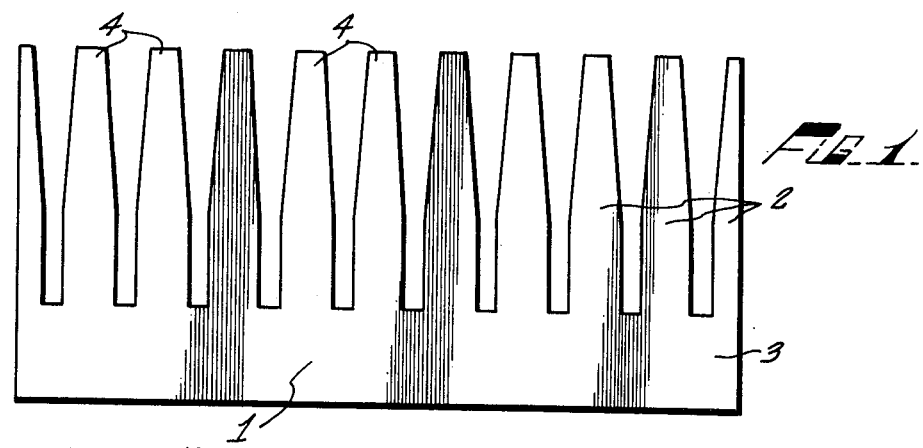
FIG. 1 illustrates a profile or "comb" used in an assembly in accordance with this invention.

The present invention is an improvement of the junction assembly disclosed in previously mentioned copending application U.S. Ser. No. 395,546 since abandoned. The present invention provides an improved assembly for protecting and insulating a junction between cables, especially a cable splice, which comprises a relatively rigid, longitudinally split tube of internal diameter such that the tube will accommodate the junction. Also included are relatively rigid support means for the split tube and a plurality of relatively flexible prongs projecting longitudinally beyond at least one, preferably each end circumference of the tube at spaced intervals around its circumference and attached to or integral with the support means. A heat shrinkable sleeve of length greater than the combined length of the tube, support means and prongs is also included. The end regions of the sleeve overlying the free ends of the prongs may have a sealing material applied thereto, such that on shrinking the sleeve down over the junction, the end regions of the sleeve which shrink down over the cables are sealed thereto.

The support means for the split tube may advantageously comprise two relatively rigid rings of substantially the same diameter as the split tube and positioned within each end of the tube. These rings may or may not extend beyond the ends of the split tube, when in position, as long as the rings do not interfere with the junction itself. Preferably, the support means on each side of the split tube are rings of substantially the same diameter as the split tube. However, other support means which retain the heat-shrinkable sleeve in position may be used.

When heat is applied to the sleeve of heat-shrinkable material, the central region surrounding the split tube is able only to shrink slightly and grip the tube tightly, because of the relative rigidity of the split tube. The regions of the sleeve surrounding the prongs are able to shrink to a progressively greater degree, from the tube end to the ends of the prongs, as the prongs become more defomrable towards their extremities. However, at some point along the length of the prongs, and more or less near their ends, the sleeve shrinks tightly onto the associated cable. The presence of the prongs causes a smooth gradation of diameter of the sleeve from the region of larger diameter surrounding the split tube to the region of smaller diameter surrounding the cable. This minimizes stress on the sleeve material, and the region of changing diameter is reinforced by the prongs.

Preferably, the central region of the sleeve which shrinks down over the split tube is not sealed thereto, or sealing is minimal. This may be achieved, for example by appropriate choice of the sealing material and surface properties of the split tube. Alternatively, only the end regions of the sleeve are coated with sealing compound, for example mastic or hot-melt adhesive, preferably to a point approximately midway along the length of the prongs. A central region slightly longer than the split tube and supports is thus left uncoated. On shrinking, the coated ends of the sleeve shrink down over the prongs, the cables, and, if present, the support rings. The uncoated central region shrinks down over the split tube and is not bonded thereto.

The prongs may be integral with the supports for the split tube, or form a separate assembly which is fixed to the support, for example by soldering. The prongs are preferably not to be attached to the split tube itself because this may tend to hamper or prevent the opening of the split tube on re-entry. The prongs may suitably form part of a profile or "comb" wherein the prongs are integral with a band. In a preferred arrangement, wherein support rings are positioned at each end of the split tube, the band from which the prongs extend may be soldered onto each support ring.

The prongs are preferably made of aluminum, which combines lightness and flexibility with great strength. Preferably the prongs are tapered toward their free ends, so that the deformability increases progressively toward the free ends. The present invention also provides a method of covering a junction between cables, especially electric cables, which comprises: positioning over the junction an assembly comprising a relatively rigid, longitudinally split tube having a relatively rigid support means, preferably a ring of substantially the same diameter as the split tube positioned at each end of the split tube having a plurality of relatively flexible prongs extending longitudinally from the end circumference thereof; and shrinking a heat-shrinkable sleeve, of length greater than the combined length of the split tube with the support means and prongs, down over the junction surrounded by the split tube with the support means and prongs, at least part of the inner wall of the heat shrinkable sleeve being provided with a sealing material such that, on shrinking, the end regions of the sleeve that shrink down the cables are sealed thereto, and the central region of the sleeve that shrinks down over the split tube is not sealed thereto.

When the support means for the split tube comprises two closed rings, it is generally necessary to position the rings on the cables before the junction is made. Alternatively, open rings provided with closing means may be used. The rings may then be positioned on the cables after the junction has been made (without the necessity of passing them along the length of the cables and then closed.

The support means should preferably be firmly connected by the split tube, for example by means of a bayonet type attachment, so that the support means and split tube do not move relative to each other during the shrinking process. This allows the optimal position of the prongs to be maintained throughout shrinking.

The heat-shrinkable sleeve may, if desired, be of the longitudinally split wrap-around type. The sleeve is then provided with sealing means along the split such that, after shrinking, a waterproof and pressure tight joint is obtained.

The split tube of relatively rigid material may conveniently take the form of a pair of half-cylinders, which may or may not be connected by hinge means. It is also possible, however, for the tube to have only a single slit, or to be divided into two unequally sized parts.

The junction covering means of the invention may easily be re-opened for repair work or modification of the junction, by slitting open the central portion of the heat-shrinkable sleeve. The split tube may then readily be removed as it is not sealed onto the shrunken sleeve. Any sealing effect may, if required, be reduced by heating the assembly to the softening point of the sealing material. After repair or modification has been carried out, the split tube may be replaced in position, and the junction resealed by means, for example, of a split wrap-around heat-shrinkable sleeve whose inner wall is coated with sealing material and which is provided with means for sealing the split to form a water-tight, pressure-tight joint. A closure as described in previously mentioned U.S. Pat. No. 3,455,336 is suitable.

Advantageously, the material of the split tube consists, at least on its outer surface, of a material with which the chosen sealant on the wrap-around sleeve will not bond, so that the junction may be reopened against at any subsequent time for repair or modification.

In the case of a cable splice, it may be required to add a new cable to the junction. This may easily be done if the shrunken sleeve is split along its whole length and removed in its entirety. The end regions, which are sealed on, may be removed after warming, to soften the sealing compound. The split tube and the supports may then be removed and the new cable may then be introduced and the assembly wrapped with a sealing tape. After placement of the split tube and the supports, the new junction may be covered by means of a split wrap-around heat-shrinkable sleeve, for example, a closure of the type disclosed in previously mentioned U.S. Pat. No. 3,455,336.

The longitudinally split tube and the supports may be made of any suitable material, for example metal, hard rubber or synthetic material, such as polyethylene, especially high density polyethylene, containing the usual additives, (fillers, pigments, flame retardents, antioxidants, etc.). If the joint is to be made in a power cable, the material is preferably irradiated to render it non-melting in the event of an overload. Other suitable plastic materials are polyvinyl chloride and polypropylene. The tubes may be made of electrically insulating, semiconducting or conducting material, as required by the particular circumstances.

The heat-shrinkable sleeve may be made of any suitble material, for example those described in U.S. Pat. Nos. 3,086,242 and 3,243,211, the disclosures of which are both incorporated by reference herein. The tube is made of a polyolefin, preferably polyethylene, crosslinked by chemical means or by irradiation, and containing the conventional additives. (fillers, flame retardents, antioxidants, etc.), suitable for a particular application.

Referring to FIG. 1, the comb 1 consists of a plurality of flat parallel prongs 2 extending from an integral band 3. The prongs 2 taper towards their ends 4.

Figure 2:
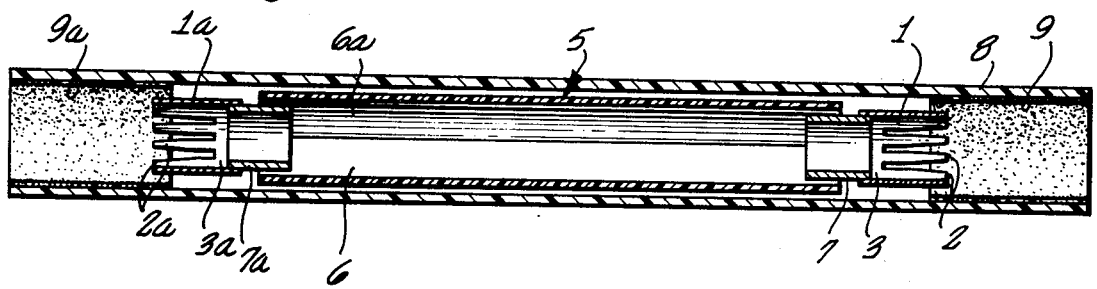
FIG. 2 illustrates a section through an assembly, in accordance with this invention, including a heat-shrinkable sleeve in its expanded state.

Referring now to FIG. 2, a relatively rigid longitudinally split tube 5, consisting of two half-cylinders 6 and 6a, is supported by two rings 7 and 7a positioned at its ends. The support rings may be attached to the tube 5 by means, such as, a bayonet type attachment. Combs 1 and 1a are fixed to the rings 7 and 7a respectively, by means such as a soldered joint between the bands 3 and 3a and the outer surfaces of the rings 7 and 7a. A heat-shrinkable sleeve 8 surrounds the assembly and, at the inner surface of each end region, is coated with sealing material 9 and 9a respectively, to a point approximately midway along the length of the respective prongs 2 and 2a. The heat-shrinkable sleeve 8, surrounding the asembly, is of length greater than the combined formed length of the tube 5, the rings 7 and 7a and the prongs 2 and 2a.

Figure 3:
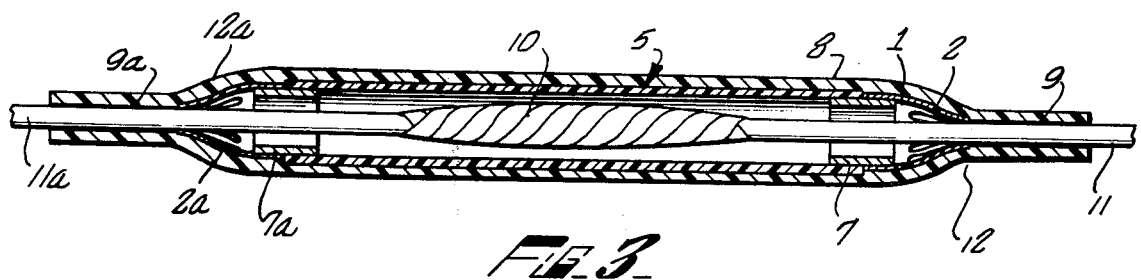
FIG. 3 illustrates an assembly, in accordance with this invention, positioned over a splice in an electric cable and including a heat-shrinkable sleeve in its shrunken state.

In FIG. 3, a cable splice 10, between cables 11 and 11a, is surrounded by the assembly shown in FIG. 2 and with sleeve 8 in its shrunken state. The end regions 12 and 12a of the sleeve 8 have shrunk onto the cables 11 and 11a thereby compressing the prongs 2 and 2a. The sealing compound 9 and 9a insure that the junction is water and pressure tight.

Figure 4:
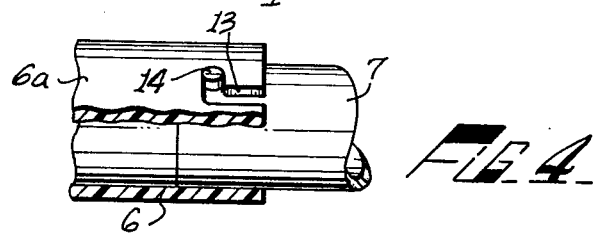
FIG. 4 illustrates the connection of the support means with the split tube by means of a bayonet type attachment.

Referring to FIG. 4, a pair of half cylinders 6 and 6a are shown. Half cylinder 6a has a slot 13 which forms a bayonet type joint with support ring 7 having pin 14. Pin 14 fits into slot 13 thereby firmly connecting the split tube to the support ring so that the support ring and the split tube do not move relative to each other during the shrinking process. A similar cavity may be present in cylinder 6a thereby requiring two diametrically opposed pins on support ring 7. The split tubes may be held together by any suitable means such as, for example, tape.

While an embodiment and application has been shown and described, it will be apparent to those skilled in the art that many more modifications are possible without departing from the inventive concepts herein described. The invention, therefore, is not to be restricted except as necessary by the prior art and by the spirit of the appended claims.

What is claimed as new and desired to be secured by Letters Patent of the United States is:

1. An assembly for protecting and insulating a junction between cables where there is a substantial diameter difference between the cables and the cable junction comprising:
   a relatively rigid longitudinally split tube of internal diameter such that said tube will accommodate the junction;
   relatively rigid support means for said split tube disposed at least partially within said tube;
   a plurality of relatively flexible prong means projecting longitudinally, at spaced intervals, beyond the circumference of at least one end of said split tube, said prong means being connected to said support means; and
   a heat-shrinkable sleeve of length greater than the length of said tube with said support means and said prong means, at least part of the inner wall of said heat-shrinkable sleeve having applied thereto a sealing material such that, on shrinking said sleeve down over the junction, the end regions of said sleeve shrink down over the cables and are sealed thereto.

2. The assembly as in claim 1, wherein said support means includes two relatively rigid separate support means for said split tube.

3. The assembly as in claim 2, wherein said two separate support means are relatively rigid support rings of substantially the same diameter as said split tube, one to be positioned at each end of said tube and said prong means being connected to each of said two support rings.

4. The assembly as in claim 3, wherein said sealing material is disposed on the inner wall of said sleeve at each of said end regions of said sleeve to a point approximately midway along the length of said prong means.

5. The assembly as in claim 3 including a band member wherein said prong means integrally extend from said band member.

6. The assembly as in claim 3 including two band members wherein said prong means integrally extent from each of said two band members and each of said two band members are respectively attached to one of said support rings.

7. The assembly as in claim 6, wherein each of said two band members are respectively formed integral with each of said support rings.

8. The assembly as in claim 1, wherein the end region of said sleeve which shrinks down over said split tube is substantially not sealed thereto.

9. The assembly as in claim 1, wherein said split tube comprises a pair of half-cylinders connected by a hinge means.

10. The assembly as in claim 1, wherein the material of said split tube consists at least on its outer surface of a material which will substantially not bond with said sealing material on said sleeve.

11. The assembly as in claim 10, wherein said material of said split tube comprises a high-density polyethylene.

12. The assembly as in claim 11, wherein said high-density polyethylene is irradiated.

13. The assembly as in claim 1, wherein the material of said heat-shrinkable sleeve comprises a cross-linked polyolefin.

14. The assembly as in claim 13, wherein said polyolefin is polyethylene.

15. The assembly as in claim 1, wherein said prong means taper toward their free ends.

16. An assembly for protecting and insulating a junction between cables where there is a substantial diameter difference between the cables and the cable junction, having a split tube and a heat-shrinkable sleeve disposed about the split tube, the sleeve including a sealing material on at least part of its inner wall, the improvement comprising a plurality of relatively flexible prong means projecting longitudinally at spaced intervals beyond the circumference of at least one end of the split tube, the heat-shrinkable sleeve being of length greater than the length of the split tube with said prong means so that, on shrinking, the end regions of the sleeve shrink down over the cables and are sealed thereto.

17. A method of covering a junction between cables where there is a substantial diameter difference between the cables and the cable junction comprising the steps of:

positioning over the junction an assembly comprising a relatively rigid longitudinally split tube having relatively rigid support means disposed therein and having a plurality of relatively flexible prongs extending longitudinally from the circumference of the ends of the support means; and shrinking a heat-shrinkable tube of length greater than the length of the split tube with the support means and prongs, down over the junction surrounded by the split tube, support rings and prongs, at least part of the inner wall of the heat-shrinkable sleeve being provided with a sealing material such that, on shrinking, the end regions of the sleeve that shrink down over the cables are sealed thereto, and the central region of the sleeve that shrinks down over the split tube is not sealed thereto.

18. A method as in claim 17, wherein the step of positioning further includes the step of positioning over the junction a relatively rigid support ring at each end of the split tube.

* * * * *